United States Patent [19]

Ayers

[11] 4,104,909

[45] Aug. 8, 1978

[54] COMBINATION GAUGE

[76] Inventor: Wayne R. Ayers, R.R. 4, Box 218, Noblesville, Ind. 46060

[21] Appl. No.: 817,603

[22] Filed: Jul. 21, 1977

Related U.S. Application Data

[63] Continuation-in-part of Ser. No. 740,598, Nov. 10, 1976, abandoned.

[51] Int. Cl.$^2$ .................................................. G09F 9/00
[52] U.S. Cl. .................................... 73/118; 116/129 P; 340/59; 340/181; 340/620; 340/688
[58] Field of Search ............... 73/117.3; 340/266; 362/23, 26, 27, 28, 29, 30; 116/28 R, DIG. 35, DIG. 36, 129 P

[56] References Cited

U.S. PATENT DOCUMENTS

| | | | |
|---|---|---|---|
| 2,963,694 | 12/1960 | Baron | 340/266 X |
| 3,114,903 | 12/1963 | Murphy et al. | 340/266 |
| 3,216,394 | 11/1965 | Blackwell | 362/26 X |
| 3,732,539 | 5/1973 | Easterly | 340/266 X |
| 3,924,255 | 12/1975 | Mori | 340/266 X |
| 3,947,814 | 3/1976 | Allen | 340/266 X |

FOREIGN PATENT DOCUMENTS

| | | | |
|---|---|---|---|
| 841,028 | 7/1960 | United Kingdom | 340/266 |

*Primary Examiner*—Jerry W. Myracle
*Attorney, Agent, or Firm*—Robert A. Spray

[57] ABSTRACT

A combination gauge for indicating a measured condition, such as battery condition or coolant system temperature, which provides both a visual light means and a numerical or other calibrated indicator gauge, providing when a special pre-set condition occurs, the user is informed not only by the calibrated gauge but also by energization of the visual light means which illuminates the visible face of the gauge itself. The gauge is particularly useful for vehicle use, or other uses in which the user's attention is not likely to be on the gauge with any high degree of continuity, and yet the condition being sensed or monitored is such that it has rather critical limits.

10 Claims, 4 Drawing Figures

COMBINATION GAUGE

This is a continuation-in-part of U.S. Patent Application Ser. No. 740,598, filed Nov. 10, 1976 now abandoned, entitled "Combination Gauge", by this same applicant.

This invention relates to a combination gauge, such as for a vehicle's battery condition or coolant liquid temperature, or engine oil pressure, or in other situations a guage for detecting such factors as insufficient air speed of aircraft, gauges for boiler pressure, or other situations as illustrated herein or otherwise.

More particularly, the present inventive concepts provide a combination gauge having both a numerical or other calibrated gauge and also a visual light means which is energized, to illuminate the face of the gauge, when a special or dangerous condition occurs in the condition being sensed.

Vehicles in the past have been provided with one or the other of such gauges or indicators, but none have had the concept of the combination which imparts the double advantage noted above.

In these past vehicles, the calibrated gauge or the indicator light, alternatively, as the case may be, has indeed provided some advantage to the user. That is, either the numerical or other calibrated gauge, on certain vehicles, or the visual light means (which in the automotive industry is commonly referred to as a "tell-tale light" or "idiot light") on other vehicles, depending upon which of the two types of indicators was provided by the prior art on any particular vehicle, has warned the user of certain conditions being sensed.

To that limited extent, each of those prior art types of devices has provided a definite advantage; but each has a corresponding disadvantage, of not providing the advantage achieved by the other.

This advantage, of either the numerical or other calibrated gauge, or of the condition-alarm light means, depending upon which of those devices was provided for any particular vehicle in the prior art, is not denied by the present invention; and, in contrast, the advantage of each of these past or prior art devices is admitted and emphasized as a background of understanding of the present inventive concepts.

The present invention, however, achieves the advantages of both of those prior gauge or indicator devices without compromise of either. That is, by the present inventive concepts, the advantages of both are achieved, by a single gauge.

More particularly, the present inventive concepts provide that the numerical or calibrated gauge gives a continual indication of the status or condition of the parameter being sensed; however, when a pre-set critical value or condition is reached by the sensed factor, the face of the gauge also becomes illuminated to achieve the full benefit of the "tell-tale light" or "idiot light" of existing vehicles.

More specific details are set forth below; and illustrations of the use of this combination gauge include that of a gauge for a vehicle, for the gauging of the temperature of the vehicle's coolant system indicated, electrical conditions such as battery, and whatever other condition is desirably to be not only sensed but whose specific condition should be made known to the user.

The combination gauge will be noted to have particular advantage in use in vehicles and similar use-situations, in which the user's attention is likely to be very primarily on things other than the gauge, and yet the condition being sensed or monitored has critical limits of particularly special or dangerous significance in contrast to merely indicating a particular quantity or nature of whatever other characteristic is being sensed or monitored.

The above description is of an introductory and generalized nature, particularly to mention the general objects and achievements and desirability of the present invention.

More particular and specific concepts, features, and details are set forth in the following more detailed description of an embodiment illustrative of the invention's concepts, taken in conjunction with the accompanying drawings.

In those drawings, which are somewhat schematic and diagrammatic in nature, it will be noted as follows.

Figure 1:
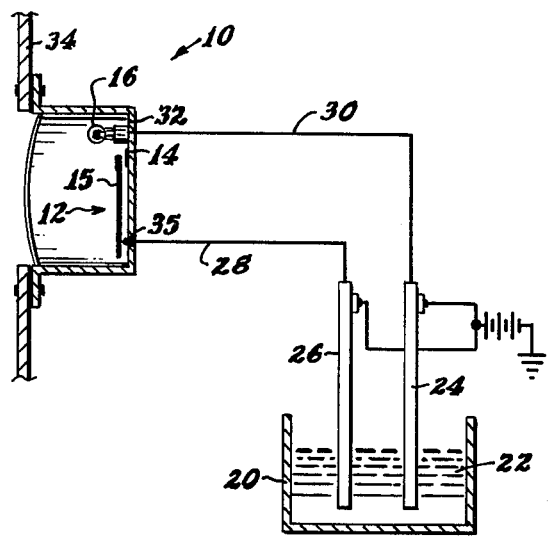
FIG. 1 is a schematic view of a combination indicator gauge of the present invention.
Figure 2:
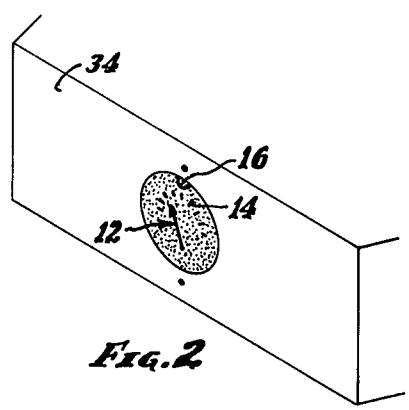
FIG. 2 is a pictorial illustration of the illustrative gauge of FIG. 1, shown illustratively as mounted on a vehicle dashboard, during an condition of the condition being sensed which is within acceptable limits of the condition.
Figure 3:
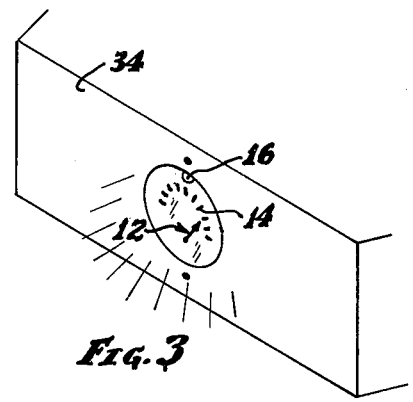
Figure 4:
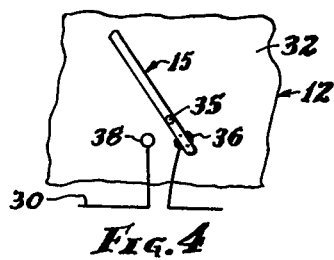

FIG. 3 is a pictorial illustration of the illustrative gauge of FIG. 2, but during a condition of the condition being sensed which has reached a certain limit or condition in which the user is to be imparted an extra warning or alertness indication, by illumination of the gauge face; and FIG. 4 is a schematic view of an alternative embodiment of control means for the visual light means of FIGS. 1, 2, and 3.

As shown in the drawings, the present inventive concepts provide, in combination, two types of condition gauges or indicators.

More particularly, the present invention provides a combination gauge 10 for indicating a measured condition, comprising, in combination, an indicator gauge means 12 having numerals or other indicia 14, and a pointer 15, for specifying to the user as to the quantity or other characteristic of the condition being sensed, and also a visual light means 16.

Even more particularly, the indicator gauge means 12 is operative to specify its sensed data to the user during various conditions of the condition being sensed, and the said visual light means 16 is operative to give its sensed data condition signal to the user during operativity of the said indicator gauge means 12 but only when the condition being sensed reaches a preselected condition which has been pre-set to energize the said visual light means 16.

The combination gauge thus provides that the user is always informed as to the quantity or other sensed characteristic of the condition being sensed, by the indicator gauge means 12; but when a special pre-set condition occurs, the user is informed not only by that gauge 12 but also he or she is especially alerted by the visual light means 16, which illuminates the face of the gauge, as is noted illustratively by comparing or contrasting the gauge as shown in FIGS. 2 and 3.

Schematically, the drawings illustrate, as the condition being sensed or monitored, a reservoir 20 of liquid 22, and an energization control means 24 for the light means 16, into which control means 24 there would have been pre-set a control for energizing the light 16 at a certain pre-set condition such as liquid over-heating, etc.

Each of the indicators is schematically shown provided with a response means operatively connected to the condition being sensed, the gauge 12 by response means 26 and the light means by the aforesaid control means 24. Each is illustrated as having suitable wiring or circuitry, respectively 28 and 30, which together with the sensing elements (not shown) are of course well known in the art.

The combination gauge 10 is illustratively shown as having a housing 32, and mounted on a vehicle's dashboard 34.

The pointer 15 is shown as carried by a bearing 35 of gauge 12.

If desired, the light means 16 may be of pulsating nature in contrast to a steady beam.

The activation of the visual light means 16 is illustratively shown schematically in FIG. 1 as by the external component 24; however, within the present inventive concepts, the light control means may be such as illustrated in FIG. 4, in which the control means is shown as mounted internally of the housing 32, and even in combination with the indicator gauge 12, such as by providing a contact element 36 on the needle or pointer 15 of gauge 12 which activates the light 16 when the pointer 15 moves to a certain position, in which pointer contact 36 electrically engages a stationary gauge housing contact 38 to close or energize the activation circuit 30.

SUMMARY

It is thus seen that a combination of both gauge and light is very advantageous in contrast to either individual device alone; for, although careful users like to know a continual condition indication of a condition which is being sensed or monitored, even they are desirably provided with the extra alarm or alertness imparted by the special alarm signal achieved by the visual light, or as sometimes called an "idiot light," which by the present inventive concepts illuminates the face of the gauge.

Accordingly, it will thus be seen from the foregoing description of the invention according to this illustrative embodiment, considered with the accompanying drawings, that the present invention provides a new combination gauge which achieves the desirable goal of achieving or imparting to the user both a continual condition signal and also the special visual alarm or warning signal of the gauge face becoming illuminated; thus the combination gauge achieves desired advantages and characteristics, and accomplishes its intended objects, including those hereinbefore pointed out and others which are inherent in the invention.

Modifications and variations may be effected without departing from the scope of the novel concepts of the invention; accordingly, the invention is not limited to the specified form or arrangement of parts herein described or shown for illustration of the inventive concepts.

What is claimed is:

1. A combination gauge for indicating a measured condition, comprising, in combination:
    a visual light means;
    first response means operatively connected to the condition being sensed and to the said visual light means;
    an indicator gauge means having numerals or other indicia for specifying to the user as to the quantity or other characteristic of the condition being sensed;
    and second response means operatively connected to the condition being sensed and to the said indicator gauge means;
    energization control means for the said visual light means, adapted to be pre-set to energize the said visual light means to illuminate the face of the indicator gauge means upon the happening of a certain condition of the condition being sensed;
    the arrangement being such that the said indicator gauge means is operative to specify its sensed data to the user during various conditions of the condition being sensed, and the said visual light means is operative to be energized to give its sensed data condition signal to the user by illuminating the face of the indicator gauge means during operativity of the said indicator gauge means but only when the condition being sensed reaches a pre-selected condition which has been pre-set into the said energization control means for the said visual light means.

2. The invention as set forth in claim 1 in which the said indicator gauge means and the said visual light means are both mounted or operatively carried within a single or unitary housing.

3. The invention as set forth in claim 2 in which the said indicator gauge means and the said visual light means are energized concurrently at the pre-set pre-selected special condition being sensed or monitored.

4. The invention as set forth in claim 3 in which the said combination gauge is provided as a gauge for sensing or monitoring conditions of a vehicle.

5. The invention as set forth in claim 2 in which the said combination gauge is provided as a gauge for sensing or monitoring conditions of a vehicle.

6. The invention as set forth in claim 1 in which the said indicator gauge means and the said visual light means are energized concurrently at the pre-set pre-selected special condition being sensed or monitored.

7. The invention as set forth in claim 6 in which the said combination gauge is provided as a gauge for sensing or monitoring conditions of a vehicle.

8. The invention as set forth in claim 1 in which the said combination gauge is provided as a gauge for sensing or monitoring conditions of a vehicle.

9. The invention as set forth in claim 1 in a combination in which the operative connection of the first response means, which as aforesaid is operatively connected to the said visual light means, is operatively connected to the condition being sensed by the indirect means of the aforesaid energization control means being of a type such that it senses the position of the said indicator gauge means in its response to the said second response means which as aforesaid is operatively connected to the condition being sensed.

10. The invention as set forth in claim 9 in a combination in which the said first response means includes contacts respectively carried by relatively movable components of the said indicator gauge means.

* * * * *